2,857,907

APPARATUS FOR EXTRACTING ANIMAL AND VEGETABLE SUBSTANCES

Willy Kaether, Braunschweig-Melverode, and Franz Mushack, Wolfenbuttel, Germany, assignors to Braunschweigische Maschinenbauanstalt, Braunschweig, Germany Application February 7, 1957, Serial No. 638,785

5 Claims. (Cl. 127—7)

This invention relates to an apparatus for extracting vegetable or animal substances from comminuted material by means of a liquid, in which the substance extracted from the material by diffusion is dissolved. The invention is particularly applicable to the extraction of sugar from sugar beet by means of water.

Known apparatus for such extraction purposes consists of a tower through which the material to be treated is conveyed upwardly from the bottom by a conveying arrangement, while the extraction liquid passes through the tower in a counter-flow arrangement from the top to the bottom and is drawn off at the bottom end of the tower.

In such apparatus, the material to be treated is commonly conveyed by screw conveyors or blades which are mounted on a shaft rotating on the axis of the container. The known extraction towers are always provided with a conveying arrangement of uniform construction, i. e., with a conveying arrangement in which there are either only helical turns or only blades on the tower shaft. This arrangement has the disadvantage that during the upward conveying movement, for example of the sugar beet pieces, blockages and destruction of the pieces occur which result in considerable losses, because greatly comminuted beet pulp cannot be effectively used. The important factor is that destroyed pieces of material irregularly consolidate the mass moved in the tower and thereby prevent the extraction liquid from being uniformly distributed over the cross-section of the tower during its descent. For this reason, pieces of sugar beet which are to be processed in continuously operating extraction towers must be carefully cut. If more than 10% of the pieces to be subjected to the extraction have a length of less than about 1 cm., the above described difficulties occur.

The known extraction towers must be of great height in order to be able to operate economically, a circumstance which involves corresponding outlay for the conveyance of the pieces and in particular for the buildings in which the towers are to be housed. Finally, a large cubic capacity is necessary in such known towers because the material and the liquid must be given facilities for compensating the irregularities occurring during the conveying operation.

According to the present invention, the extraction apparatus comprises a tower through which an extraction liquid flows downwards and the comminuted material is moved by a conveyor upwards in contact with the liquid, in which a rotatable shaft carrying the conveyor extends along the axis of the tower, and the tower contains three zones consisting of a stirring zone at the bottom, an extraction zone in the middle and a discharge zone at the top, the stirring zone having an oulet covered by a screen through which the extraction liquid flows out of the tower and an inlet through which the comminuted material being raised from the stirring zone into the extraction zone by blades projecting radially in stepped formation from the rotatable shaft within the stirring zone and then through the extraction zone to the discharge zone by inclined vanes projecting radially from the shaft in the extraction zone, the vanes being arranged in rings around the periphery of the shaft with the vanes in one ring disposed opposite the spaces between the vanes in the adjacent rings, the vanes co-operating with guide plates projecting from the inner surface of the tower into the spaces between adjacent rings of vanes and the comminuted material finally being raised through the discharge zone by blades on the shaft forming an interrupted helix within the discharge zone the blades cooperating with further guide plates which project from the inner surface of the tower and pass through the interruption in the helix as the shaft rotates, after which the comminuted material is discharged from the tower through an outlet in the discharge zone by a worm conveyor.

The shaft rotating in the axis of the tower may consist of two parts which are independent of one another, each part having its own independent drive. However, it is also possible to construct the shaft in such manner that only one drive is necessary, it being possible, at choice, to drive the shaft at the discharging zone or at the stirring zone.

In the stirring zone, the material pumped in separates from the conveying liquid with which it was mixed because the liquid flows off through the screen forming the bottom limit of the zone as the comminuted material is stirred and distributed. Through this screen there also flows the extraction liquid trickling downwards from the top through the tower and which is enriched with sugar or other substances. The extraction liquid is extracted from the tower at an outlet located below the screen.

In the stirring zone, the stepped stirring and distributing blades effect a loosening of the comminuted material which are at the same time raised in uniform manner into the extraction zone disposed above the stirring zone. In the extraction zone, the material, set in brisk movement by the many vanes mounted on the tower shaft, moves further upwards floating freely. Unimpeded diffusion over the entire surface can take place in the floating material so that a high degree of extraction is obtained. The possibility of blockages within the extraction zone is reduced. The mixing ratio between liquid and the comminuted material is always constant in the extraction zone. Owing to the fact that the individual vanes of the vane wheels adjacent one another in the vertical direction overlap, sinking of the material and thus the production of a blocked compact mass at the bottom end of the tower are obviated should the conveying arrangement come to a stop.

In the uppermost zone, i. e. the discharging zone, the comminuted material comes within range of a screw conveyor provided with interrupted turns. This conveyor effects rapid conveyance of the material out of the tower. In this way, any effect on the processes in the extraction zone of the tower is reliably avoided.

The guide plates provided in the extraction zone and which project radially into the intermediate spaces between two adjacent rings of vanes are tilted upwardly. These guide plates impart an upwardly directed component of movement to the material, and can be turned around axes at right angles to the tower shaft for the purpose of varying this angle of inclination and so influencing the upward movement. The vanes can be secured in varying positions on the tower wall.

The extraction liquid is expediently supplied to the tower at a point located between the discharging zone and the extraction zone. In view of this position of the supply of the liquid, an additional cooling or washing process can be carried out on the comminuted material in the discharging zone. Alternatively, part of the extraction liquid may be introduced into the tower at the upper end and the remainder at the lower end of the discharging zone. In order to cool the material already in the discharging zone and to save using a special cooling device for the material, it is preferable to supply the liquid introduced into the container below the discharging zone at a higher temperature and the liquid introduced at the upper end of the discharging zone at a lower temperature. A special heating arrangement may be installed in the pipe supplying the liquid to the bottom end of the discharging zone, while the liquid introduced into the container above the discharging zone is not heated and may even be cooled.

An example of an apparatus in accordance with the invention for extracting sugar from sugar beet is illustrated in the accompanying drawings in which.

Figure 4:
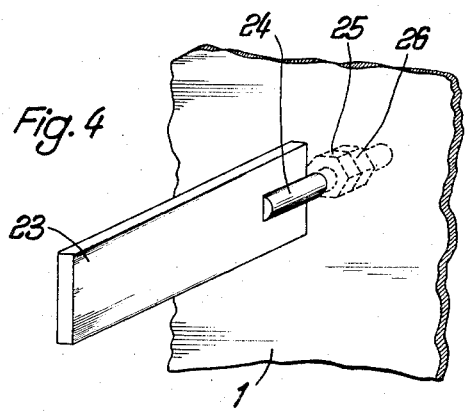

Fig. 4 shown on an enlarged scale the means for fixing the guide plates, which means, for example, are adjustable and connected to the container wall in the extraction zone.

The apparatus comprise a cylindrical extraction tower 14 having a casing 1. The casing 1 is supported by means of brackets 2 on a foundation or bed 3. A hollow shaft 4 rotates on the axis of the tower 14 in bearings 5. The shaft, in the example illustrated, consists of two independantly rotatable parts. The lower part 4a is driven by two gears 6 and 7, gearing 8 and an electric motor 9. The drive of the upper, longer part of the shaft is effected by an electric motor 10 through the gearing 11 and the gears 12 and 13. The gears 6, 7 and 12, 13 are in each case arranged adjacent the tower 14.

The extraction tower 14 is divided into three zones, namely a stirring zone A, an extraction zone B and a discharging zone C.

In the stirring zone A, three-stage stirring blades 15 displaced in step-like fashion are mounted on the lower part 4a of the shaft. Sugar beet pieces which have been made pumpable with water, or a liquid which is already enriched with sugar, are supplied to this zone by a pump 17 provided with a suction pipe 16 and a pressure pipe 18. The stirring blades 15 distribute the pumped material uniformly over the cross-section of the tower 14 and raise it, owing to their step-like form, into the extraction zone B located above the stirring zone.

The stirring zone is provided at the bottom with a screen 19 through which the liquid required for making the beet pumpable and the liquid coming from above and enriched with sugar flows off. The concentrated sugar solution is drawn off through the pipe 20.

Figure 1:
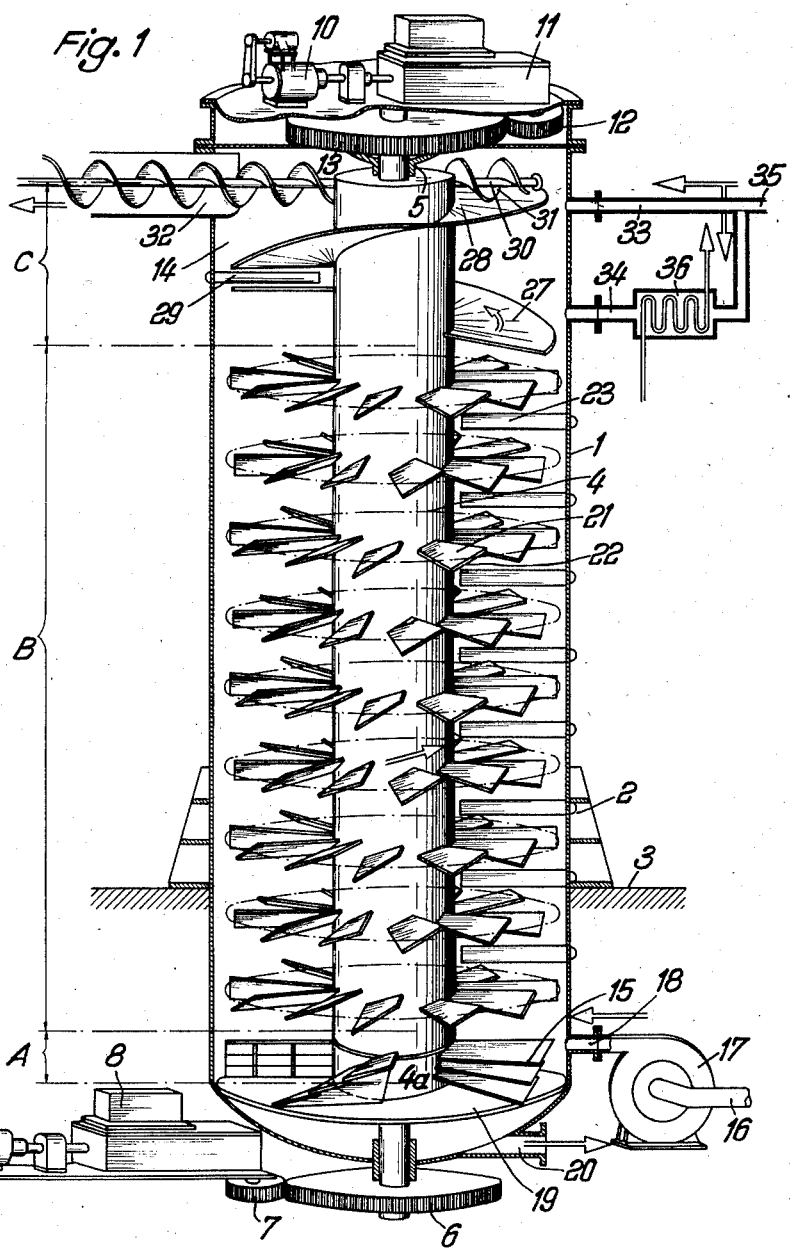
Fig. 1 is a perspective view showing a vertical section through the tower-like container and an elevation of the tower shaft with the conveying devices mounted thereon.

The part of the hollow shaft 4 located in the extraction zone B carries a number of rings of vanes, arranged one above the other, the vanes 21 of which are displaced obliquely in a fan-like manner out of the plane of the rings and, as shown in Fig. 1, are so arranged on the hollow shaft 4 that the vanes of alternate rings are opposite the gaps between adjacent vanes in the ring between.

The vanes 21 consist of flat plates which are bent downwardly at their leading edges 22. All the vanes are connected to the hollow shaft 4 at the same angle of inclination with respect to the planes of the vane rings. Thus, in each case, all the trailing edges of the vanes are disposed in an upper plane and all the leading edges 22 of the plates are disposed in a plane located beneath the said upper plane.

Into the free spaces which are located between each two adjacent vane rings guide plates 23 project radially inwards. The guide plates 23 are fixed to the casing 1. The inclination of the plates 23 can be altered. Fig. 4 shows one way of fixing the plates to the container wall 1 by means of a bolt 24 and two nuts 25, 26 which, for the purpose of altering the inclination of the guide plates, need only be loosened and then tightened again.

The discharging zone C immediately above the extraction zone B is provided with a screw conveyor, the turns 27 and 28 of which are interrupted. In zone C also guide plates 29 project radially from the container wall 1 into the spaces located between each two superimposed turns of the screw conveyor.

At the upper end of the discharging zone C there is arranged a discharging worm conveyor 30, 31, which carries the spent material after the sugar has been extracted, away to the outside through an outlet 32.

The liquid required for the extracting process enters the tower through pipes 33 and 34, which branch off from a common pipe 35. The pipe 33 opens into the upper end and the pipe 34 into the lower end of the discharging zone C. A heating device 36 may be installed in the pipe 34.

Figure 2:
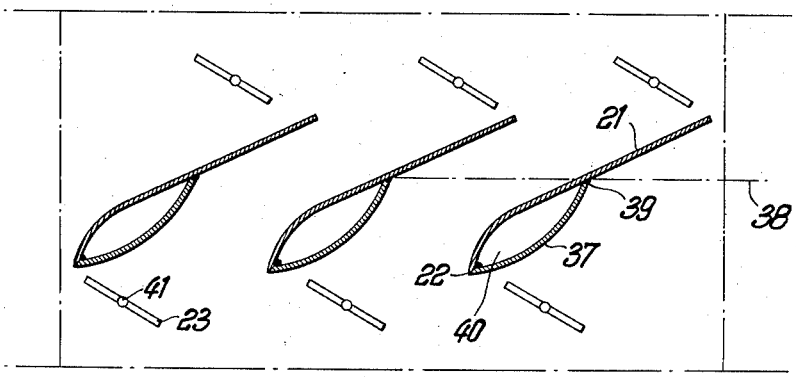
Fig. 2 is a development of a modified vane wheel located in the extraction zone of the tower and of the associated guide plates.

Fig. 2 of the drawing shows a modification of the vanes 21 shown in Fig. 1. In this modification, curved reinforcing plates 37 are welded to the underside of the vanes, which are bent downwardly only slightly at their leading edges. The plates 37 start from the leading edge 22 of the plates 21. The curved reinforcing members together with the flat vanes 21 enclose hollow spaces 40 of pointed oval shape. In addition to the vanes 21, the guide plates 23 and their pivots 41 are also shown in Fig. 2.

Figure 3:
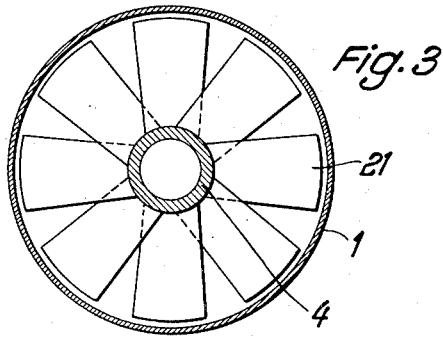
Fig. 3 shows in cross-section the further modified arrangement of the vanes of a vane wheel having fewer vanes than are shown in Fig. 1.

Fig. 3 shows the construction of the vane rings. The inner portions of the vanes 21 connected to the hollow shaft 4 overlap one another in the form of a fan. The vanes are so arranged in the individual planes of the vane rings that the gaps between the vanes 21 of an upper ring of vanes are covered by the vanes 21 of the ring of vanes disposed immediately below.

The extraction apparatus of the invention, as compared with the known arrangements, results in a substantial improvement in the degree of extraction, in spite of reduced over-all height of the tower, and is reliable in operation. This is due to the division of the tower into three zones, each having its own function. Each zone being provided with distributing, stirring and discharging devices which are independent in each case. Special importance must be attached to the central extraction zone, because the pieces from which substances are to be extracted are set in brisk upward motion in this zone, the extraction liquid circulating around each individual piece.

We claim:

1. Apparatus for extracting vegetable and animal substances from comminuted material with an extraction liquid, comprising a tower, a rotatable shaft extending along the axis of said tower, means for rotating said shaft, conveyor means fixed to said shaft for conveying said comminuted material upwardly from the bottom of said tower to the top of said tower, said tower containing three zones consisting of a stirring zone at the bottom of said tower, an extraction zone in the middle of said tower and a discharge zone at the top of said tower, said stirring zone having an outlet through which said extraction liquid flows and an inlet, a screen covering said outlet and means for pumping said comminuted material through said inlet into said stirring zone, said conveyor means comprising blades projecting radially in stepped formation from said rotatable shaft within said stirring zone, said blades conveying said comminuted material from said stirring zone to said extraction zone, said conveyor means further comprising inclined vanes projecting radially from said shaft in said extraction zone, said vanes being arranged in rings around the periphery of said shaft with the vanes in one ring disposed opposite spaces between the blades in adjacent rings, guide plates projecting from the inner surface of said tower into the spaces between adjacent rings of said vanes, said vanes cooperating with said guide plates to convey said comminuted material through said extraction zone to said discharge zone and said conveyor means still further comprising an interrupted helical blade on said shaft within said discharge zone, further guide plates projecting from the inner surface of said tower, said further guide plates passing through the interruption in said helical blade as said shaft rotates, and said discharge zone having an outlet opening and a worm conveyor in said discharge zone for discharging said comminuted material through said opening.

2. Apparatus as claimed in claim 1, in which said vanes consist of plates, the leading edges of said plates being bent downwardly.

3. Apparatus as claimed in claim 1, in which said vanes consist of conveyor plates, the leading edges of which are bent downwardly, and curved reinforcing plates underlying said conveyor plates, said reinforcing plates being welded to said conveyor plates and enclosing spaces of pointed oval shape between said conveyor plates and said reinforcing plates.

4. Apparatus for extracting vegetable and animal substances from comminuted material with an extraction liquid, comprising a tower, a rotatable shaft extending along the axis of said tower, means for rotating said shaft, conveyor means fixed to said shaft for conveying said comminuted material upwardly from the bottom of said tower to the top of said tower, said tower containing three zones consisting of a stirring zone at the bottom of said tower, an extraction zone in the middle of said tower and a discharge zone at the top of said tower, said stirring zone having an outlet through which said extraction liquid flows and an inlet, a screen covering said outlet and means for pumping said comminuted material through said inlet into said stirring zone, said conveyor means comprising a plurality of groups of overlapping superposed blades, projecting radially in stepped formation from said rotatable shaft within said stirring zone each blade in each group being recessed as compared to any blade below it, said groups of blades conveying said comminuted material from said stirring zone to said extraction zone, said conveyor means further comprising inclined vanes projecting radially from said shaft in said extraction zone, said vanes being arranged in rings around the periphery of said shaft with the vanes in one ring disposed opposite spaces between the blades in adjacent rings, guide plates projecting from the inner surface of said tower into the spaces between adjacent rings of said vanes, said vanes cooperating with said guide plates to convey said comminuted material through said extraction zone to said discharge zone and said conveyor means still further comprising an interrupted helical blade on said shaft within said discharge zone, further guide plates projecting from the inner surface of said tower, said further guide plates passing through the interruption in said helical blade as said shaft rotates, a first pipe connected to said tower at the upper end of said discharge zone for supplying extraction liquid, a second pipe at the lower end of said discharge zone for supplying extraction liquid and means for selectively alternately closing said first pipe and respectively said second pipe and said discharge zone having an outlet opening and a worm conveyor in said discharge zone for discharging said comminuted material through said opening.

5. Apparatus as claimed in claim 4, further comprising means for heating said extraction liquid in said second pipe.

References Cited in the file of this patent

UNITED STATES PATENTS

| | | |
|---|---|---|
| 2,653,114 | Langen | Sept. 22, 1953 |

FOREIGN PATENTS

| | | |
|---|---|---|
| 1,090,851 | France | Oct. 20, 1954 |
| 516,705 | Belgium | Jan. 31, 1953 |